United States Patent
Higaki et al.

(10) Patent No.: US 7,360,017 B2
(45) Date of Patent: Apr. 15, 2008

(54) STORAGE CONTROL DEVICE FOR LONGEVITY OF THE DISK SPINDLES BASED UPON ACCESS OF HARD DISK DRIVES

(75) Inventors: Seiichi Higaki, Ninomiya (JP); Hisao Honma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 10/803,910

(22) Filed: Mar. 19, 2004

(65) Prior Publication Data

US 2005/0144383 A1 Jun. 30, 2005

(30) Foreign Application Priority Data

Dec. 25, 2003 (JP) ............................. 2003-428624

(51) Int. Cl.
*G06F 12/00* (2006.01)
*G06F 1/26* (2006.01)

(52) U.S. Cl. ...................... 711/114; 711/203; 713/310; 713/300; 713/320

(58) Field of Classification Search ..................... None
See application file for complete search history.

(56) References Cited

U.S. PATENT DOCUMENTS

| | | |
|---|---|---|
| 5,193,184 A | 3/1993 | Belsan et al. |
| 5,197,055 A | 3/1993 | Hartung et al. |
| 5,392,244 A * | 2/1995 | Jacobson et al. ........... 711/114 |
| 5,394,532 A | 2/1995 | Belsan |
| 5,404,485 A | 4/1995 | Ban |
| 5,701,284 A | 12/1997 | Lee |
| 5,745,789 A | 4/1998 | Kakuta |
| 5,860,137 A * | 1/1999 | Raz et al. ................... 711/202 |
| 5,889,937 A | 3/1999 | Tamagawa |

(Continued)

FOREIGN PATENT DOCUMENTS

JP 06-004979 6/1992

(Continued)

OTHER PUBLICATIONS

Art Baker, "The Windows NT Device Driver Book", Prentice Hall (1997), pp. iii, and 62-71.

(Continued)

*Primary Examiner*—Hyung S. Sough
*Assistant Examiner*—Kaushik Patel
(74) *Attorney, Agent, or Firm*—Reed Smith LLP; Stanley P. Fisher, Esq.; Juan Carlos A. Marquez, Esq.

(57) ABSTRACT

The present invention provides a storage control device which enables the time between failures to prolong as much as possible, though it uses HDD's whose mean time between failures is relatively short. The storage control device controls spindle motors in a manner that a spindle motor is rotated regarding the HDD of data which can access from a host computer and a spindle motor is stopped regarding the HDD of data which are clearly judged that a host computer does not access the data. Whether the host computers can access the HDD or not is judged by the fact that whether the memory region (internal logical volume) provided by the HDD is in mapped to the host logical volume or not which is recognized by the host computer and is able to access thereby.

31 Claims, 10 Drawing Sheets

U.S. PATENT DOCUMENTS

| | | |
|---|---|---|
| 5,963,971 A | 10/1999 | Fosler et al. |
| 6,038,639 A | 3/2000 | O'Brien et al. |
| 6,105,103 A | 8/2000 | Courtright, II et al. |
| 6,167,459 A | 12/2000 | Beardsley et al. |
| 6,304,940 B1 | 10/2001 | Beardsley et al. |
| 6,349,313 B1 | 2/2002 | Momoh et al. |
| 6,356,915 B1 | 3/2002 | Chtchetkine et al. |
| 6,512,652 B1 | 1/2003 | Nelson et al. |
| 6,519,678 B1 | 2/2003 | Basham et al. |
| 6,591,356 B2 | 7/2003 | McMurdie et al. |
| 6,606,690 B2 | 8/2003 | Padovano |
| 6,622,177 B1 | 9/2003 | Eilert et al. |
| 6,708,265 B1 | 3/2004 | Black |
| 6,725,331 B1* | 4/2004 | Kedem .................. 711/117 |
| 6,754,661 B1 | 6/2004 | Hallin et al. |
| 6,760,828 B1 | 7/2004 | Black |
| 6,839,827 B1 | 1/2005 | Beardsley et al. |
| 6,857,057 B2* | 2/2005 | Nelson et al. ............ 711/203 |
| 6,857,059 B2 | 2/2005 | Karpoff et al. |
| 6,957,303 B2 | 10/2005 | Fujimoto et al. |
| 6,977,927 B1 | 12/2005 | Bates et al. |
| 2002/0069245 A1 | 6/2002 | Kim |
| 2002/0073297 A1* | 6/2002 | Mizuno et al. ............ 711/202 |
| 2002/0143903 A1 | 10/2002 | Uratani et al. |
| 2002/0144057 A1* | 10/2002 | Li et al. .................. 711/112 |
| 2002/0188768 A1* | 12/2002 | Hirakawa et al. ............ 710/8 |
| 2003/0004981 A1 | 1/2003 | Kaneda et al. |
| 2003/0093439 A1 | 5/2003 | Mogi et al. |
| 2003/0126327 A1* | 7/2003 | Pesola et al. ................ 710/74 |
| 2003/0131182 A1 | 7/2003 | Kumar et al. |
| 2003/0156345 A1 | 8/2003 | Fayeulle et al. |
| 2003/0159058 A1 | 8/2003 | Eguchi et al. |
| 2003/0193732 A1 | 10/2003 | Hakamata et al. |
| 2003/0204597 A1 | 10/2003 | Arakawa et al. |
| 2003/0204700 A1 | 10/2003 | Beissener et al. |
| 2003/0211859 A1 | 11/2003 | Ellis et al. |
| 2003/0212859 A1 | 11/2003 | Ellis et al. |
| 2003/0221077 A1 | 11/2003 | Ohno et al. |
| 2003/0229645 A1 | 12/2003 | Mogi et al. |
| 2004/0054648 A1 | 3/2004 | Mogi et al. |
| 2004/0054939 A1* | 3/2004 | Guha et al. ................. 713/300 |
| 2004/0128443 A1 | 7/2004 | Kaneda et al. |
| 2004/0193827 A1 | 9/2004 | Mogi et al. |
| 2005/0018339 A1 | 1/2005 | Tanner |
| 2005/0210098 A1 | 9/2005 | Nakamichi et al. |
| 2005/0267986 A1 | 12/2005 | Murakami et al. |

FOREIGN PATENT DOCUMENTS

| | | |
|---|---|---|
| JP | 2000-112822 | 10/1998 |
| JP | 2000-293314 | 4/1999 |
| JP | 2002-288108 | 3/2001 |

OTHER PUBLICATIONS

Jon William Toigo, "Introducing Time Addressable Storage: A Common-Sense Approach to Data Protection", Toigo Partners International LLC, May 28, 2003, pp. 1-14.

Shaul Dar et al., "dbSwitch™-Towards a Database Utility", SIGMOND Jun. 13-18, 2004, Paris, France, 5 pages.

Darrell C. Anderson et al., "Interposed Request Routing for Scalable Network Storage", ACM Transactions on Computer Systems, vol. 20, No. 1, Feb. 2002, pp. 25-48.

Edward K. Lee et al., "Petal: Distributed Virtual Disks" System Research Center, 1996 ACM, pp. 84-92.

"iSCSI Virtualization Switch 3000 Provides iSCI Bridging and Virtualization", 2 pages http://www.itseccity.de/content/worldwidenews/qaa/020618_wor_qaa_sanrad.html.

"iSCSI Virtualization Switch- Product Family Overview", 1 page http://www.itseccity.de/content/worldwidenews/productnews/021124wor_akt_sanrad.html.

SANRAD Application Note: Data Migration Solution Transferring DATA Between Storage Systems over Fibre-Channel or SCSI Connections, 2003, pp. 1-9.

SANRAD Application Note: Using iSCSI to Deliver Remote Backup Service, 2003, pp. 1-11.

SANRAD Application Note: Migrating Individual Servers to an iSCSI SAN, 2003, pp. 1-15.

Doug Allen, "From the Data Center to the Network: Virtualization Bids to Remap the LAN", Feb. 5, 2004, URL: http://www.itarchitechtmag.com/shared/printableArticle.jhtml?articleID-17602026, 8 pages.

* cited by examiner

FIG. 4

| NUMBER OF HOST LOGICAL VOLUME | NUMBER OF INTERNAL LOGICAL VOLUME |
|---|---|
| 3-10 | 3-6 |
| 3-x | 3-y |
| 3-(x+1) | 3-(y+1) |
| ⋮ | ⋮ |
| 3-(x+n) | 3-(y+n) |

FIG. 5

| NUMBER OF ECC GROUP | NUMBER OF INTERNAL LOGICAL VOLUME |
|---|---|
| 3-3 | 3-6 |
| 3-4 | 3-7 |
| 3-5 | 3-8, 3-9 |
| ⋮ | ⋮ |
| 3-X | 3-Y |

STORAGE CONTROL DEVICE FOR LONGEVITY OF THE DISK SPINDLES BASED UPON ACCESS OF HARD DISK DRIVES

CROSS-REFERENCE TO RELATED APPLICATION

This application relates to and claims priority from Japanese Patent Application No. 2003-428624, filed on Dec. 25, 2003, the entire disclosure of which is incorporated herein by reference.

BACKGROUND OF THE INVENTION

1. Field of the Invention

The present invention relates to a technique for controlling writing and reading of data from a upper device in a storage control device equipped with a plurality of disk drives.

2. Description of the Related Art

There are hitherto the transaction and database as principal applications of the storage control device such as a disk array system. In such applications severe requirements are thus imposed as regards high performance and high reliability. Therefore, the storage control device used for this application is equipped with a hard disk drive (HDD) with high performance and high reliability. As the HDD fully complying with the imposed requirements must be highly reliable as one of parts, it would be usually highly expensive.

A technique for saving dissipation power of the disk array system equipped with such HDD's has been proposed.

Such a technique is disclosed in, for example, JP-A-2000-293314.

However, such a technique of the prior art is not effective for the disk array system or storage control device used for the applications such as back-up, restore, archive and the like.

SUMMARY OF THE INVENTION

In order to solve the problems described above, the present invention has the following features.

A upper device in the present invention comprises application programs, control programs, user interfaces, application interfaces and host bus adapters. Respective configurations and processing flow charts will be explained in paragraphs describing the mode for carrying out the invention.

The storage control device according to the present invention comprises channel adapters, memories, disk adapters, a connecting device and a plurality of disk drives.

The channel adapter is connected to the upper device so that the channel adapter provides a first logical volume to the upper device, which is a logical volume for a host computer or other upper device (hereinafter interchangeable with "a host volume" or "a upper logical volume" and receives data which are sent from the upper device to the first logical volume.

The memory is connected to the channel adapter and stores data exchanged between the memory and the upper device, control information concerning the data exchanged between the memory and the upper device, and the configuration information concerning the configuration of the storage control device.

The disk adapter controls in a manner that data sent from the upper device to a first logical volume are read from the memory and written on the memory as data addressed to second logical volume corresponding to the first logical volume. The second logical volume is a logical volume mapped to a storage region therein (hereinafter interchangeable with "an inner logical volume") and used as a region for storing the data in transmission and reception of the data between the channel adapters and the disk adapters.

The connecting device is connecting between the channel adapters, memory and disk adapters.

A plurality of disk drives are connected to the disk adapters so that the data to the second logical volume are written on the disk drives as data group having a redundant relation by controlling of the disk adapters.

The channel adapter has processors to provide to the upper device a logical volume for control which is utilized when the configuration information in the memory is read by the upper device. The processor of the channel adapter causes other second logical volume instead of the second logical volume to correspond to the first logical volume in response to a change-over indication issued from the upper device to the logical volume for control and causes to operate spindle motors of a plurality of disk drives on which data group corresponding to the second logical volume and having the redundant relation is written.

The processor of the channel adapter causes to stop the spindle motors of a plurality of disk drives on which data group corresponding to the second logical volume to be changed in response to the change-over indication and having the redundant relation is written.

The processor of the channel adapter judges whether spindle motors of the plurality of disk drives are operating or not, on which disk drives data group corresponding to the another second logical volume designated by the change-over indication and having the redundant relation is written, and if the spindle motor is operating, to cause the operation to continue, and if the spindle motor is not operating, to cause to operate the spindle motor of the plurality of disk drives on which data group corresponding to the another second logical volume and having the redundant relation is written.

If one corresponding to the another second logical volume corresponding to the other first logical volume provided to the upper device exists in the plurality of disk drives on which data group corresponding to the second logical volume to be changed in response to the change-over indication and having the redundant relation is written, the processor of the channel adapter causes the operation of the plurality of disk drives to continue on which drives data group corresponding to the second logical volume to be changed in response to the change-over indication and having the redundant relation is written.

If one corresponding to the other second logical volume corresponding to the other first logical volume provided to the upper device does not exist in the plurality of drives on which the data group corresponding to the second logical volume to be changed in response to the change-over indication and having the redundant relation, the processor of the channel adapter causes to stop the operation of a plurality of disk drives on which disk drives the data group corresponding to the second logical volume to be changed in response to the change-over indication and having the redundant relation is written.

If the kind of command sent from the upper device to the logical volume for control is a write command, the processor of the channel adapter writes the content of the write command on the logical volume for control and judges the content of the write command to be the change-over indication.

In the case that the kind of the command sent from the upper device to the logical volume for control is a read command, the processor of the channel adapter judges the read command to be a configuration information, and reads the configuration information from the memory and send it to the upper device.

In the case that a command sent from the upper device is the command addressed to the first logical volume, the processor of the channel adapter judges the command sent from the upper device to be a command concerning writing or reading of data, and also in the case that the command sent from the upper device is the command addressed to the logical volume for control, the processor judges the command sent from the upper device to be a command concerning the control information.

Although the processor of the channel adapter performs various kinds of control in the above description, other control processor, for example, the processor of the disk adapter may preferably carry out the control the same as that described above. Moreover, it is preferable that the processor of the channel adapter and the processor of the disk adapter carry out the control the same as the control described above in cooperation with each other.

More detailed configuration and processing flow chart will be explained in paragraphs of mode for carrying out the invention later.

According to the present invention, the effective controlling method can be provided for disc array systems or storage control devices used for the applications as back-up, restore and archive.

We intend to effect the back-up, restore and archive of data at a high speed in a short period of time in consideration of various elements such as increased capacity of data memorized in the storage control device, variety of kinds thereof and operations around the clock. Therefore, we contemplate the back-up, restore and archive using the storage control device equipped with HDD's as storage mediums for the field in which the back-up and restore of data and archive are carried out by tape drives, as well. In such applications, as large capacity is particularly required, the requirement imposed upon the storage control device is to provide great capacity of memory at much less expensive.

In order to reply to the requirement, we intended to utilize the HDD using the serial ATA (S-ATA) as interconnection interface which has been used in less expensive desktop PC, at the sacrifice of the performance and reliability to some extent.

As the HDD using fiber channel as interconnection interface is predetermined to be provided in the host computer operating as a server, the HDD is inherently designed to operate around the clock. In contrast herewith, as the HDD using S-ATA as interconnection interface is predetermined to be provided in the disk top PC and the like, the HDD is inherently designed to be used only a few hours every day.

In the HDD using S-ATA as interconnection interface, therefore, the mean time between failures (MTBF) which is one index of reliability is in general designed to be shorter in comparison with the HDD using fiber channel as interconnection interface. Accordingly, the HDD using S-ATA as interconnection interface is prone to failures in comparison with the HDD using fiber channel as interconnection interface, when the spindle motor of the HDD is always rotated as in the operation around the clock.

On the other hand, it is unlikely that the access to the HDD as a storage medium always occurs in the application of the HDD to the back-up, restore and archive. In back-up or restore, for example, writing of data onto the storage control device would occur once or a few times a day, only when the back-up is obtained, and reading of data from the storage control device would occur very rarely, only when restoring. In the use of the archive, moreover, writing of data onto the storage control device would occur only when the archive is obtained, while reading of data from the storage control device would occur only when archived data are rarely referred.

In the storage control device used for applications of the back-up, restore and archive in this manner, the access to data of storage medium does not occur frequently so that it is effective for the spindle motor of the HDD having the data stored therein to stop in the case that no access to the data occurs evidently.

Other objects, features and advantages of the invention will become apparent from the following description of the embodiments of the invention taken in conjunction with the accompanying drawings.

BRIEF DESCRIPTION OF THE DRAWINGS

FIG. 4 is one example of configuration information table held in the storage control device of the embodiment according to the invention and used for managing correspondence between the numbers of the host logical volumes and the internal logical volumes;

FIG. 5 is one example of configuration information table held in the storage control device of the embodiment according to the invention and used for managing correspondence between the numbers of the ECC groups and the numbers of the internal logical volumes provided by the ECC groups;

DETAILED DESCRIPTION OF THE EMBODIMENTS

The control method for a disk array system without continuous operation of a spindle motor of HDD in consideration of the service life of the HDD using the S-ATA as an interconnection interface will be explained with reference to the drawings hereinafter.

According to the aspect for carrying out the invention, it will be expected that the time until occurrence of fault, which is presumed by the MTBF, can be prolonged by performing the control for stopping the spindle motor of the HDD, in comparison with the case using the spindle motor of the HDD without its stoppage.

Figure 1:
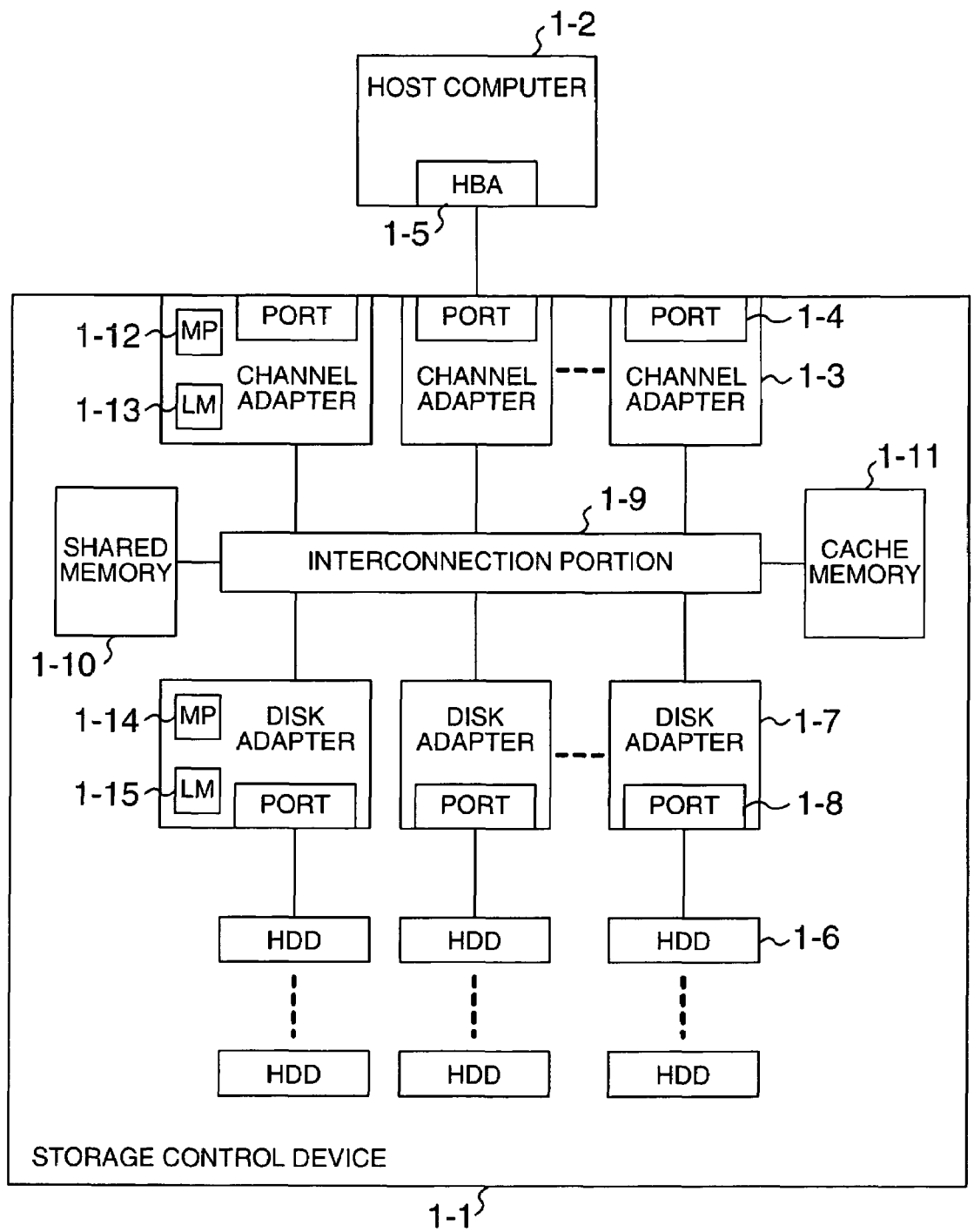
FIG. 1 is an example of the hardware configuration of the storage control device envisioned in the embodiment of the present invention.

FIG. 1 illustrates a configuration of the storage control device. Reference numeral 1-1 shows the storage control device and numeral 1-2 denotes a host computer connected to the storage control device. The storage control device 1-1 is equipped with a plurality of channel adapters 1-3. Each of the channel adapters 1-3 has a port 1-4 through which the channel adapter 1-3 is connected to a host bus adapter (HBA) 1-5 equipped in the host computer by means of, for example, a fiber channel.

The storage control device 1-1 is equipped with a plurality of hard disk drives (HDD) 1-6 as storage mediums. The storage control device 1-1 is further equipped with a plurality of disk adapters 1-7 for controlling the plurality of HDD's 1-6. The disk adapters 1-7 each have a port 1-8 for connecting the HDD's, by means of which the disk adapters 1-7 are connected to the plurality of HDD's 1-6. The ports 1-8 and the plurality of HDD's 1-6 are each connected by FC-Al of fiber channel, fabric or parallel SCSI or ATA or S-ATA.

The channel adapters 1-3 are each connected to the disk adapter 1-7 to each other through an interconnection portion 1-9 to which a shared memory 1-10 as well as a cache memory 1-11 are connected. The channel adapters 1-3 and the disk adapters 1-7 are each equipped with a microprocessor 1-12, 1-14 and a local memory 1-13, 1-15 in a pair. In the microprocessor 1-12 on the channel adapter 1-3, the program is executed for processing the command sent from the host computer 1-2. In the microprocessor 1-14 on the disk adapter 1-7, the program is executed for controlling the plurality of HDD's 1-6. The program is operated by the use of the local memory, respectively. In order to carry out processing in cooperation of the plurality of channel adapters 1-3 with the plurality of disk adapters 1-7, control information which must be shared with one another is put in the shared memory 1-10. It is possible for the microprocessor 1-12 on each of the channel adapter 1-3 and the microprocessor 1-14 on each of the disk adapter 1-7 to access the control information in the shared memory through the interconnection portion 1-9.

The cache memory 1-11 serves to temporarily store data which the host computer 1-2 may access. As the cache memory 1-11 can access data at a faster rate than HDD 1-6, the cache memory 1-11 contributes to improvement in the access performance (particularly responsibility to commands) of the storage control device.

Figure 2:
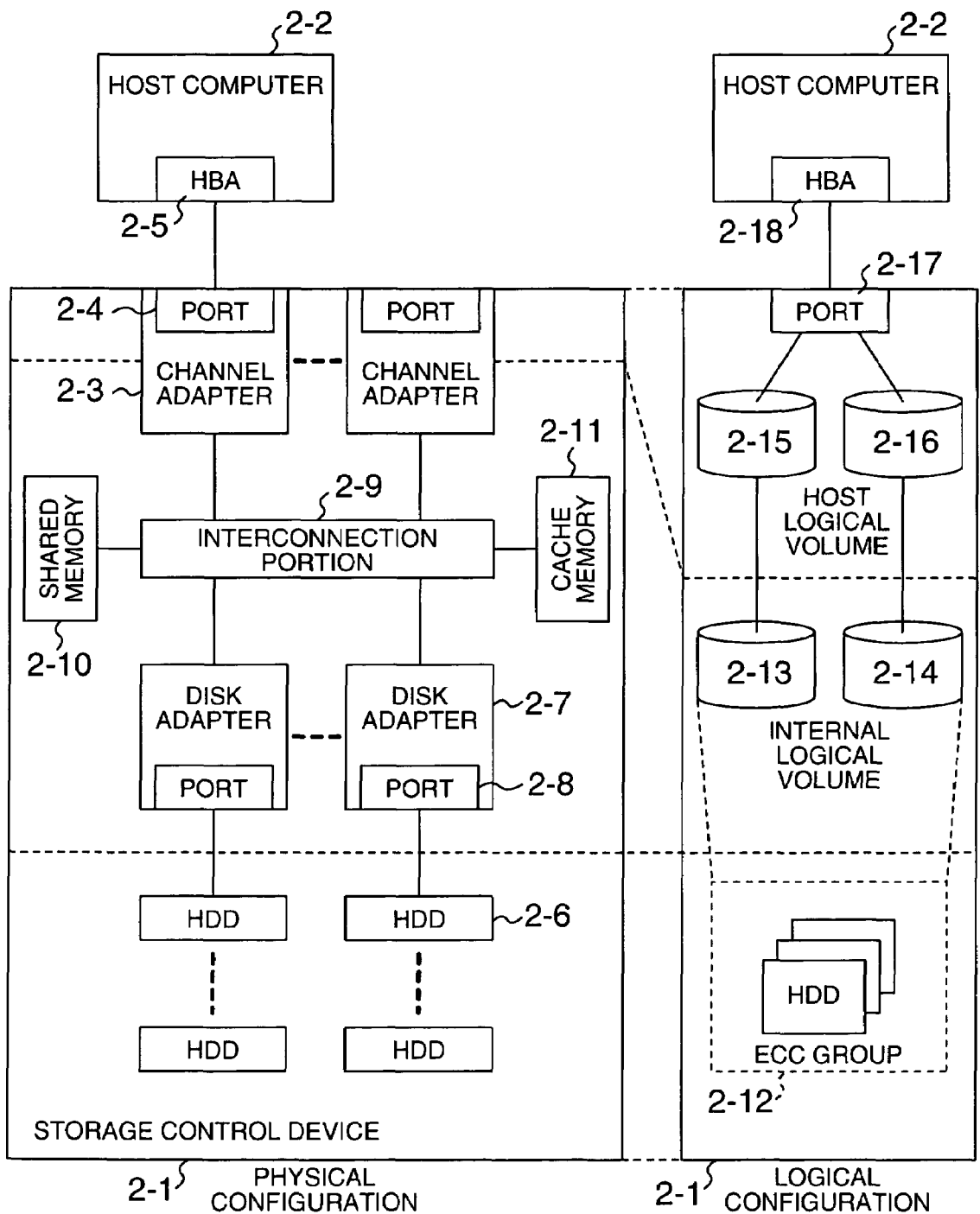
FIG. 2 is one example of the correspondence of the hardware configuration and logical configuration of the storage control device envisioned in the embodiment of the present invention.

The left hand of FIG. 2 is a view explaining the storage control device 1-1 described in FIG. 1 from the viewpoint of its physical configuration (a simplified view of FIG. 1). In contrast herewith, the right hand of FIG. 2 is a view explaining the storage control device 1-1 from the viewpoint of its logical configuration. FIG. 2 is a view for explaining a mapping between the physical configuration and the logical configuration.

A few of HDD's among the plurality of HDD's 2-6 are assembled to form an Error Check and Correction group (ECC group) 2-12. The ECC group is constituted as redundant array of independent disks (RAID) and protects data memorized from single-point fault of HDD in the ECC group.

The storage region formed by the ECC group is divided into one or plural regions to produce internal logic volumes. In the example shown in FIG. 2, one ECC group 2-12 is divided into two regions to produce two internal logical volumes 2-13 and 2-14. The internal logical volumes 2-13 and 2-14 are logical volumes provided by the program executed in the microprocessor (1-14 in FIG. 1, not shown in FIG. 2) in the disk adapter 2-7.

In order that the host computer 2-2 reads and writes data out and on the storage control device 2-1, it is required that the host computer 2-2 has recognized the host logical volumes 2-15 and 2-16 provided by the storage control device 2-1.

The host logical volumes 2-15 and 2-16 are logical programs which are provided to the host computer 2-1 by programs executed in the microprocessors (1-12 in FIG. 1, not shown in FIG. 2) in the channel adapters 2-3. For example, fiber channels and Logical Units (LU) in SCSI may map to the host logical volumes.

The host logical volumes 2-15 and 2-16 themselves are imaginary ones not having actual memory regions. The host logical volumes and the internal logical volumes map to one to one, respectively. The host logical volume 2-15 maps to the internal logical volume 2-13 having an actual memory region for memorizing data, while host logical volume 2-16 maps to the internal logical volume 2-14, respectively.

The mapping of the host logical volume and internal logical volume is stored as a configuration information in the shared memory 2-10 and controlled by the program executed in the microprocessor (1-12 in FIG. 1, not shown in FIG. 2) in the channel adapter 2-3.

The data written from the host computer onto the host logical volume are written onto the internal logical volume having the actual memory region according to the mapping between the host logical volume and the internal logical volume. Namely, for example, the data that the host computer 2-2 wrote on the top logical block of the host logical volume 2-15 through the port 2-17 are actually written on the top logical block of the internal logical volume 2-13. Similarly, for example, the data that the host computer 2-2 wrote on the 100th logical block from the top of the host logical volume 2-16 are actually written on the 100th logical block from the top of the internal logical volume 2-14.

Figure 3:
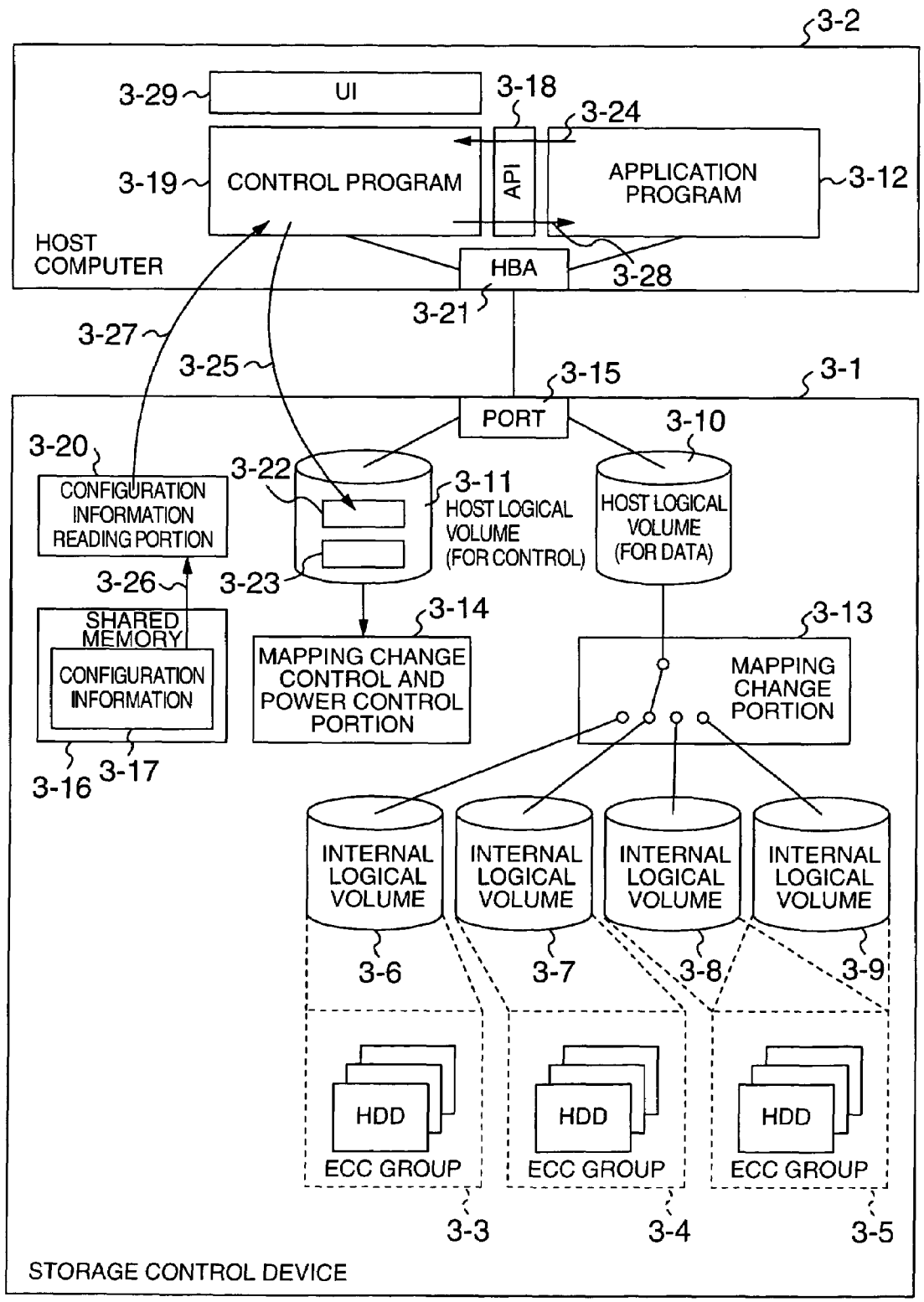
FIG. 3 is one example of the method for reading the configuration information by the logical configuration of the storage control device envisioned in the embodiment of the present invention.

FIG. 3 is a view newly drawn by further adding the details to the logical configuration of the storage control device explained in connection with the right hand of FIG. 2 for disclosing the present invention.

The storage control device 3-1 includes three ECC groups 3-3 to 3-5. In the memory region formed by the three ECC groups 3-3 to 3-5, four internal logical volumes 3-6 to 3-9 are formed. The internal logical volume 3-6 exists in the ECC group 3-3, the internal logical volume 3-7 in the ECC group 3-4, and the internal logical volumes 3-8 and 3-9 in the ECC group 3-5, respectively.

The storage control device 3-1 has two kinds of host logical volumes. The host logical volume (for data) of the one kind is used to store the data that are recognized by the host computer 3-2 and to be used by the application program 3-12 in the host computer 3-2. The host logical value (for control) of the other kind will be explained later. A plurality of the host logical volumes (for data) and a plurality of the host logical volumes (for control) can exist in the storage control device 3-1, respectively. FIG. 3 illustrates the host logical volume (for data) 3-10 and host logical volume (for control) 3-11 as representative of these volumes.

In FIG. 3, there are four internal logical volumes 3-6 to 3-9 for one host logical volume (for data) 3-10. A mapping change portion 3-13 is provided between the host logical volume (for data) 3-10 and the four internal logical volumes 3-6 to 3-9. The mapping change portion 3-13 serves to change the mapping between the host logical volume (for data) 3-10 and the internal logical volumes 3-6 to 3-9 according to the indication from a mapping change and power control portion 3-14.

The mapping between the host logical volume and the internal logical volume is controlled by a program executed by the microprocessors in the channel adapters. Therefore, both the mapping change portion 3-13 and the mapping change and power control portion 3-14 are realized by this program.

For example, when the host logical volume (for data) 3-10 is in the mapping relation to the internal logical volume 3-6, the data written on the top logical block of the host logical volume (for data) from the host computer 3-2 through the port 3-15 are in fact written on the top logical block of the internal logical volume 3-6.

Similarly, for example, when the host logical volume (for data) 3-10 is in the mapping relation to the internal logical volume 3-9, the data written on the top logical block of the host logical volume (for data) from the host computer 3-2 through the port 3-15 are written on the top logical block of the internal logical volume 3-9.

A configuration information 3-17 holding the logical configuration of the storage control device is memorized in part of the shared memory 3-16 in the storage control device 3-1. The configuration information includes a table for holding the mapping of the numbers of the host logical volumes and the numbers of the internal logical volumes in mapping relation to the host logical volumes as exemplarily shown in FIG. 4 and a table for holding the numbers of ECC groups and the numbers of the internal logical volumes included in the ECC groups as exemplarily shown in FIG. 5.

The change mapping between the host logical volume and the internal logical volume in the storage control device will be then explained in connection with the indication from the host computer 3-2. There are two methods for changing the mapping between the host logical volume and the internal logical volume.

One method is carried out by the indication issued from the application program 3-1 in the host computer 3-2.

This method includes roughly two steps.

In the step 1, the application program takes, from the configuration information 3-17 in the storage control device 3-1, the information of 1) configuration of the host logical volumes, 2) configuration of the internal logical volumes and 3) mapping between the host logical volume and the internal logical volume.

This step 1 is carried out by the application program if required. For example, the step 1 is performed when the application program 3-12 is started or by an evident indication effected when an operator of the application program 3-12 knows a variation of the physical or logical configuration of the storage control device 3-1.

In the step 2, the application program 3-12 performs the change mapping between the host logical volume and the internal logical volume on the basis of the configuration information of the storage control device 3-1 taken in the application program 3-12 in the step 1. The step 2 is also carried out by the application program 3-12 if required.

First, the operation of the step 1 will be explained.

An application program interface (API) 3-18 is called in order that the application program 3-12 to be executed in the host computer 3-2 takes the configuration information 3-17 which the storage control device 3-1 has. The API 3-18 is provided by a control program 3-19 which is also executed in the host computer 3-2. The control program 3-19 is a program having a function issuing an indication to the configuration information reading portion 3-20 for reading out configuration information 3-17 and a function issuing an indication to the mapping change and power control portion 3-14 for changing the mapping between the host logical volume and the internal logical volume.

The control program 3-19 can access another kind of host logical volume (for control) 3-11 (to be explained later) in the storage control device 3-1 through the HBA 3-21 and the port 3-15. This host logical volume (for control) 3-11 does not store the data of the application program but is used to control the storage control device 3-1. The term "control" is here understood as signifying the function for reading out the configuration information 3-17 and the function for changing the mapping between the host logical volume and the internal logical volume.

The interior of the host logical volume (for control) 3-11 is divided in plurality of regions. A particular function is determined with respect to each region. For example, the region 3-22 is used for reading out the configuration information 3-17. When the logical block assigned in the region 3-22 is read out by the host computer 3-2, in concrete terms, by the control program 3-19, the configuration information 3-17 is included in the block.

For example, moreover, the region 3-23 is used for the function for changing the mapping between the host logical volume and the internal logical volume, so that the mapping between the host logical volume and the internal logical volume can been changed when the control program 3-19 writes a required information on the logical block assigned in the region 3-23. (This procedure will be explained in connection with the step 2 later.) Details of processing effected by the operations in step 1 will be disclosed herein.

The application program 3-12 to be executed in the host computer 3-2 calls out the API 3-18 for reading out the configuration information 3-17 of the storage control device 3-1 (3-24).

Similarly, the control program 3-19 to be executed in the host computer 3-2 recognizes the indication for reading out of the configuration information 3-17 by the fact that the API 3-18 is called. Then, the program 3-19 issues, to the host logical volume (for control) 3-11, a command for reading out the region 3-22 to be used for the function for reading out the configuration information 3-17 in the host logical volume (for control) 3-11 through the HBA 3-21 and the port 3-15 (3-25).

The command received on the side of the channel adapters is processed by the program executed by the microprocessor in the channel adapter.

Figure 6:
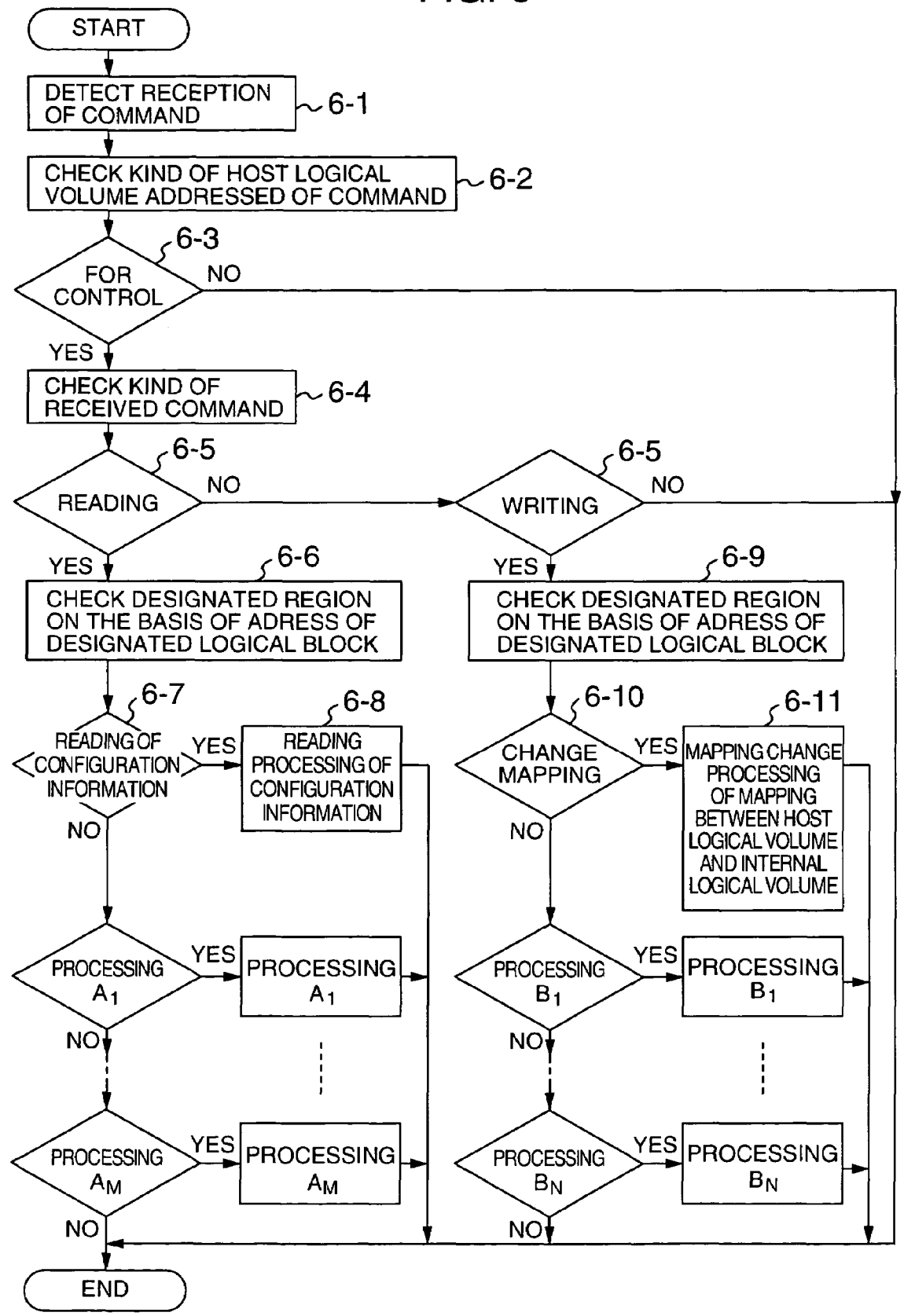
FIG. 6 is one example of flow chart of the program operating in the channel adapters of the embodiment according to the present invention.

The program is operated on the basis of the flow chart as shown in FIG. 6 every time the command is received from the host computer 3-2. First, the reception of the command is detected (6-1).

Then, the program checks the kind of the host logical volumes (for control or for data) (6-2). This can be effected by examining the configuration information of the host logical volume held in the configuration information 3-17 by the use of the number of the host logical volume contained in the command.

As a result, the program can identify whether the relevant host logical volume is for control or data (6-3). As the command has been issued for the host logical volume (for control) 3-11 in the step 1, the host logical volume is judged it to be for control.

Thereafter, the program checks the kind (reading, writing or others) of the command (6-4). This is effected by checking command codes included in the command.

As a result, the program can identify the kind of command (reading, writing or others) (6-5). As the command has been issued for reading the region 3-22 in the host logical volume (for control) 3-11 in the step 1, the kind of the command is judged to be "reading".

Then, the program checks which region in the relevant host logical volume (for control) 3-11 (6-6) should be read out. This is effected by checking the numbers of the logical block contained in the command.

As the result, the program can know the processing to be effected (6-7). As the region 3-22 assigned for reading performance for the configuration information 3-17 is designated in the step 1, the processing to be effected is judged to be "reading of the configuration information 3-17". Then, the program performs the configuration information reading processing 6-8.

The configuration information reading processing 6-8 is effected by the configuration information reading portion 3-20 which is part of the program executed by the microprocessor in the channel adapter.

The configuration information reading portion 3-20 reads the configuration information 3-17 held in the shared memory 3-16 (3-26).

The configuration information reading portion 3-20 sends the read configuration information 3-17, as a response to the command for reading the region 3-22 (3-27), to the control program 3-19 through the path through which the command has been issued.

The control program 3-19 sends the configuration information 3-17 obtained from the interior of the storage control device 3-1 to the application program 3-12 which has called the API 3-18 for reading the configuration information 3-17 (3-28).

In this manner, the application program 3-12 obtains the configuration information 3-17 in the storage control device 3-1 described above, whereby the application program 3-12 can know 1) the configuration of the host logical volume, 2) the configuration of the internal logical volume, and 3) the mapping between the host logical volume and the internal logical volume.

Details of processing effected by the operation in step 2 will be disclosed herein.

The application program 7-12 to be executed in the host computer 7-2 calls out the API 7-18 for changing the mapping between the host logical volume and the internal logical volume in the storage control device 7-1 (7-24).

Similarly, the control program 7-19 to be executed in the host computer 7-2 recognizes the indication for changing the mapping between the host logical volume and the internal logical volume by the fact that the API 7-18 has been called. The control program 7-19 sends a command for writing information required for changing the mapping between the host logical volume and the internal logical volume (the number of the host logical volume to be changed and the number of the internal logical volume to be newly mapped thereto) to the region 7-22 which is in the host logical volume (for control) 7-11 and to be used for the change mapping between the host logical volume and the internal logical volume. This command is sent through the HBA 7-21 and the port 7-15 to the host logical volume (for control) 7-11 (7-25).

The command received on the side of the channel adapters is processed by the program executed by the microprocessor in the channel adapter.

As described above, the program is operated on the basis of the flow chart as shown in FIG. 6 every time the command is received from the host computer 7-2. First, the reception of the command is detected (6-1).

Then, the program checks the kind of the host logical volume (for control or for data) (6-2). This can be effected by examining the configuration information of the host logical volume held in the configuration information 3-17 by the use of the number of the host logical volume contained in the command.

As a result, the program can identify whether the relevant host logical volume is for control or data (6-3). As the command has been issued for the host logical volume (for control) 3-11 in the step 2, the host logical volume is judged to be for control.

Thereafter, the program checks the kind (reading, writing or others) of the command (6-4). This is effected by checking command codes included in the command.

As a result, the program can identify the kind of command (reading, writing or others) (6-5). As the command for writing on the region 7-22 in the host logical volume (for control) 7-11 has been issued in the step 2, the kind of the command is judged to be writing.

Then, the program checks on which region in the relevant host logical volume (for control) 7-11 should be written (6-9). This is effected by checking the numbers of the logical block contained in the command.

As a result of this, the program knows the processing to be performed (6-10). In the step 2, as the region 7-23 is designated as a region assigned for the function for changing the mapping between the host logical volume and the internal logical volume, the processing to be performed is judged to be the change mapping between the host logical volume and the internal logical volume. Then, the program carries out the processing 6-11 for changing the mapping between the host logical volume and the inner logical volume.

The processing 6-11 for changing the mapping between the host logical volume and the internal logical volume is carried out by a mapping change control and power control portion 7-14 which is part of the program to be executed by the microprocessor in the channel adapter.

Figure 8:
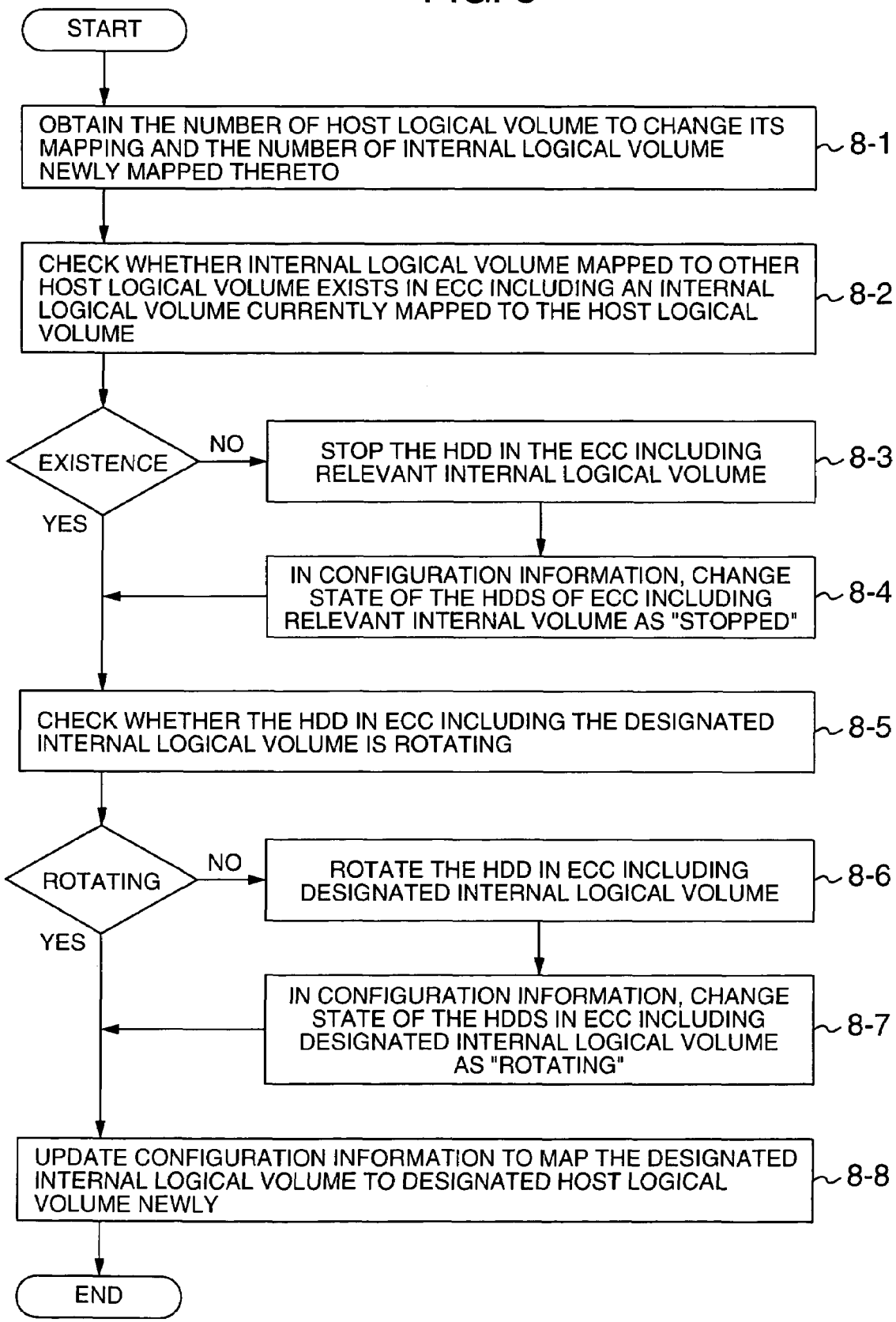
FIG. 8 is one example of flow chart for changing the correspondence between the host logical volume and the internal logical volume by the program operating in the channel adapter of the embodiment according to the present invention.

The mapping change control and power control portion 7-14 carries out the processing for changing the mapping between the host logical volume and the internal logical volume on the basis of a flow chart as shown in FIG. 8.

A processing performed at the beginning is the examination of the information written on the region 23 (the number of the host logical volume to change its mapping and the number of the internal logical volume to be newly mapped thereto) (8-1).

Next, carried out is to check whether there is (are) other internal logical volume(s) mapped to other host logical volume(s) in the ECC group including the internal logical volume mapped to the host logical volume designated in the region 7-23 (8-2). This examination is effected by retrieving a table holding the numbers of the ECC groups exemplarily shown in FIG. 5 and the numbers of the internal logical volumes included in the respective relevant ECC groups.

When it is judged that there is no other internal logical volume as a result of the retrieval of the tables exemplarily shown in FIG. 5, the program causes the host logical volume designated in the region 7-23 to stop a spindle motor of the HDD belonging to the ECC group including the internal logical volume presently in the mapping relation (8-3). This is effected by a command for stopping the spindle motor, which is sent from the program to be executed in the microprocessor in the channel adapter to the HDD belonging to the relevant ECC group (7-26). Explaining the command for stopping the spindle motor with reference to FIG. 2, the command is sent from the port 2-8 of the disk adapter 2-7 through the FC-Al of fiber channel connecting the HDD 2-6, or fabric or parallel SCSI or ATA, S-ATA or the like.

There is a rotating time of the spindle motor as an element for determining MTBF which is a parameter of reliability of the HDD. As disclosed in the present invention, the time presumed from the MTBF till fault occurs can be prolonged by stopping the spindle motor. As it has been known that there is no host logical volume mapped to the internal logical volume in the relevant ECC group, it can be regarded that there is no access from the host computer and therefore if the spindle motor of the HDD belonging to the relevant ECC group is stopped, the host computer can be operated without any problem.

Figure 9:
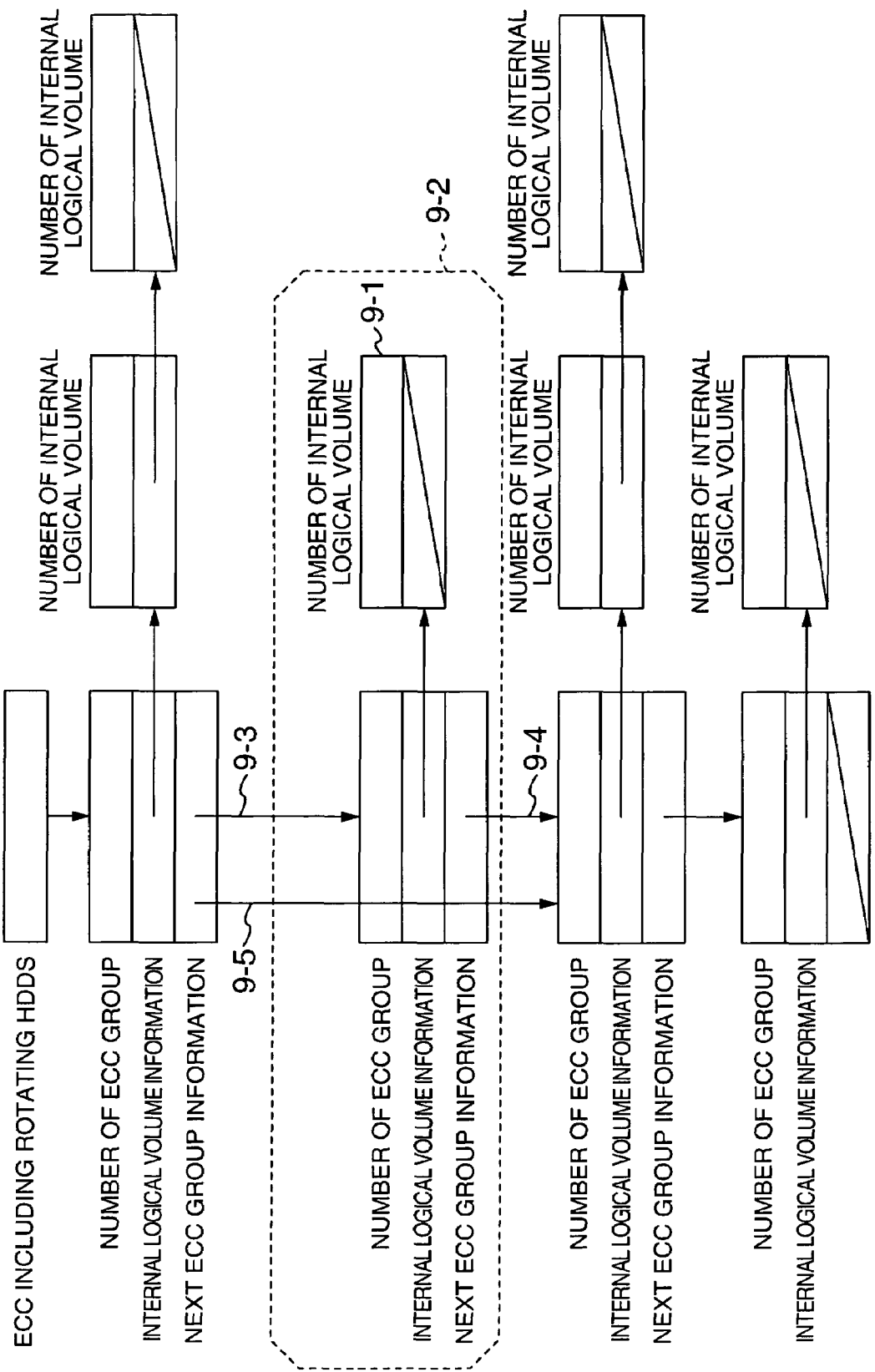
FIG. 9 is one example of configuration information table held in the storage control device in the embodiment of the present invention and used for managing the correspondence between the numbers of the ECC groups including HDD having the rotating spindle motor and the numbers of the internal logical volumes included in the ECC groups.

A configuration as shown in FIG. 9 is used to hold the numbers of the ECC groups having the HDD of which spindle motor is rotating and the numbers of the internal logical volumes provided by its ECC groups. It may be regarded that there is HDD having a rotating spindle motor in the ECC group having the configuration coupled at a pointer, and number held in the configuration.

The configuration exemplarily as shown in FIG. 9 is held as one of the configuration information 7-17 in the shared memory 7-16.

The processing to be carried out next by the program is to remove the information concerning the ECC group, to which the HDD having the stopped spindle motor belongs, from the configuration existing in the configuration information 7-17 as shown in FIG. 9. Therefore, the processing to be carried out by the program is to change state of the HDDs of ECC including relevant internal logical volume as "STOPPED" or to update the configuration information 7-17 so that there is no HDD having a rotating spindle motor, as a result of the above removal of the information (8-4).

The configuration indicating the internal logical volume currently mapped to the host logical volume designated in the region 7-23 is the configuration 9-1 in FIG. 9. And the configuration indicating the ECC group to which the internal logical volume belongs is the configuration 9-2.

Therefore, in order to update the configuration as exemplarily illustrated in FIG. 9 by the program, removed is the information concerning the ECC group to which the HDD belongs, in which HDD the spindle motor has been stopped. In other words, the portion 9-3 surrounded by dotted lines is removed. This is concretely effected by replacing pointers by new one by the program. (The pointers 9-4 and 9-5 are removed and the pointer 9-6 is newly set.)

In this manner, the information concerning the ECC group containing the internal logical volume currently mapped to the host logical volume designated in the region 7-23 is removed resulting in the state that in the relevant ECC, there is no HDD in which a rotating spindle motor has been stopped.

Then, the program checks whether the spindle motor is rotating, which is of the HDD in the ECC group including the internal logical volume designated to be newly mapped to the host logical volume designated in the region 7-23 (8-5). This is effected by retrieving the configuration as exemplarily shown in FIG. 10 (the same configuration in FIG. 9, although being divided for convenience of explanation) included in the configuration 7-17. If the number of the relevant ECC group is found in the configuration exemplarily shown in FIG. 10, the spindle motor of the HDD in the ECC group is rotating.

If it is judged that the spindle motor of the HDD is not rotating, whose HDD is in the ECC group containing the internal logical volume designated to be newly mapped to the host logical volume designated in the region 7-23, the program causes to rotate the spindle motor of the HDD belonging to the ECC including the internal logical volume now mapped to the host logical volume designated in the region 7-23 (8-6).

In the similar manner to the stoppage of the spindle motor of the HDD described above, this is effected by sending a command for rotating the spindle motor from the program to be executed in the microprocessor in the channel adapter to the HDD belonging to the relevant ECC group (7-26). Explaining the command for stopping the spindle motor with reference to FIG. 2, the command is sent from the port 2-8 of the disk adapter 2-7 through the FC-AL of fiber channel connecting the HDD 2-6, fabric or parallel SCSI, or ATA, SATA or the like.

Figure 10:
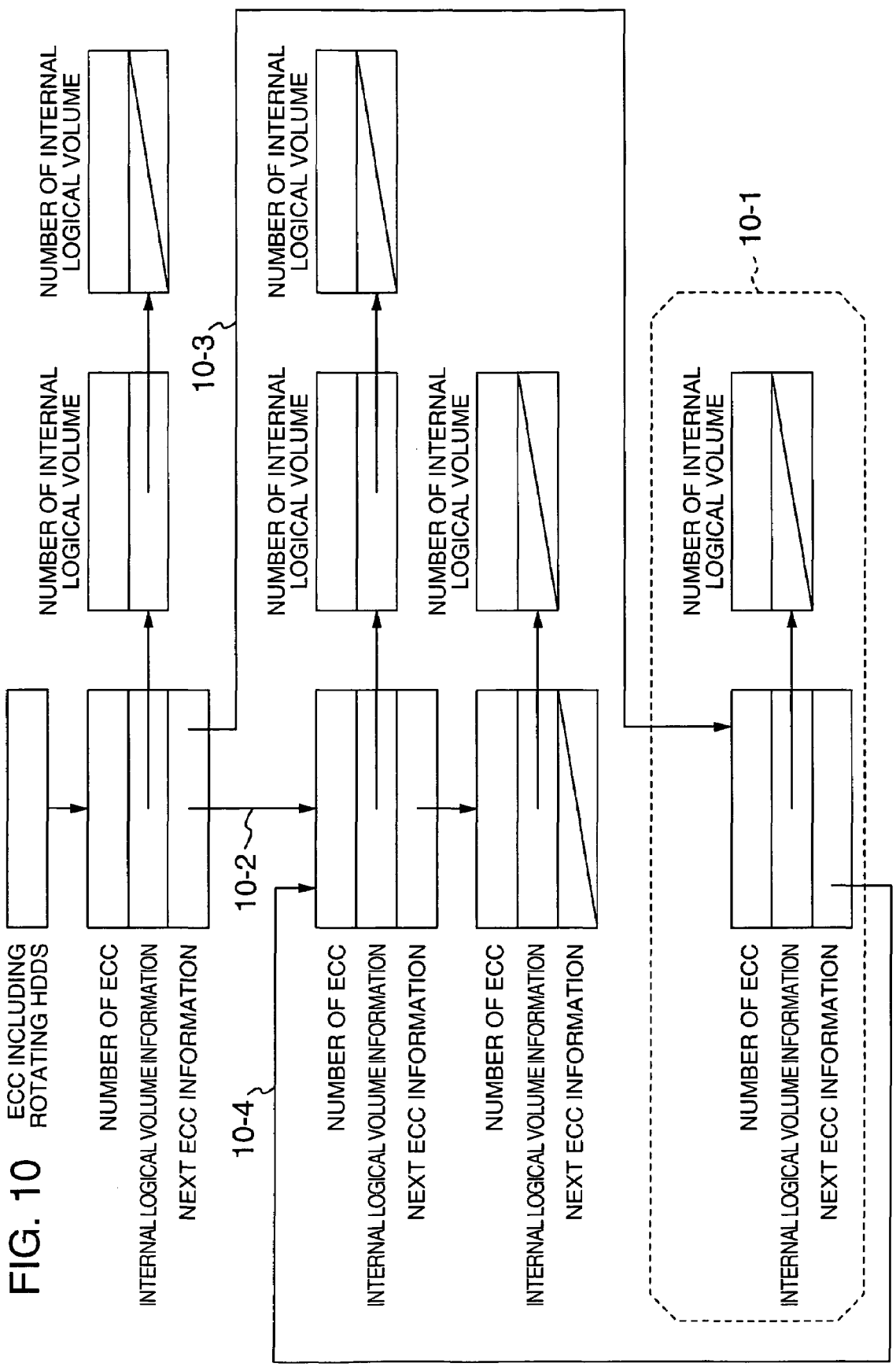
FIG. 10 is one example of configuration information table held in the storage control device of the embodiment according to the present invention and used for managing the correspondence between the numbers of the ECC groups including HDD having the rotating spindle motor and the numbers of the internal logical volumes included in the ECC groups.
Figure 11:
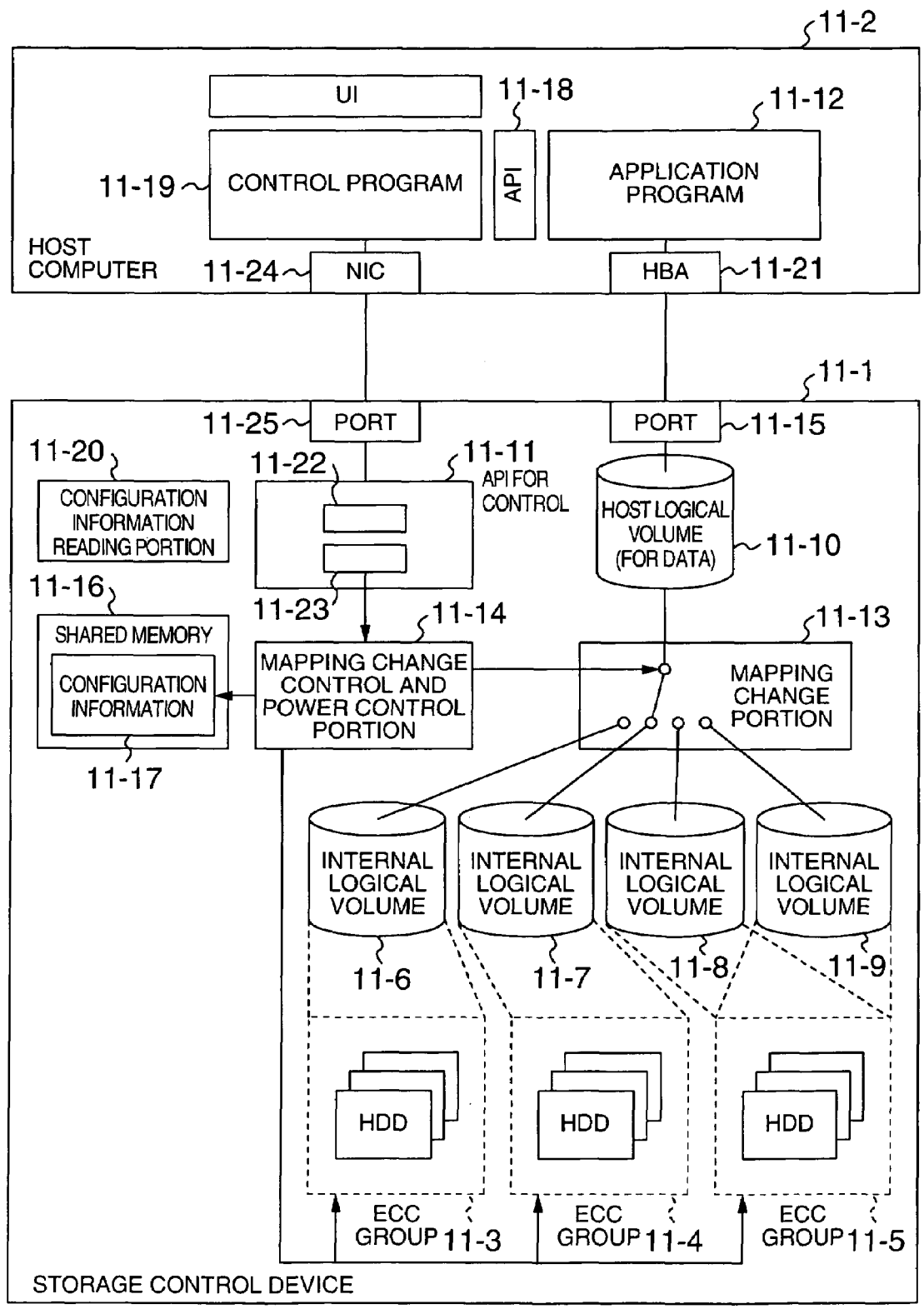
FIG. 11 is one example of the method for reading the configuration information by the logical configuration of the storage control device envisioned of the embodiment according to the present invention.

The next processing to be effected by the program is to add the information concerning the ECC group to which the HDD belongs, whose spindle motor has been rotated, from the configuration in the configuration information 7-17 as exemplarily shown in FIG. 10 to change state of the HDDs in ECC including designated internal logical volume as "ROTATING" or to update the configuration information 7-17 in a manner that there is the HDD having the rotating spindle motor in the relevant ECC group (8-7).

If the portion 10-1 surrounded by dotted lines in FIG. 10 is the configuration illustrating the ECC group of which spindle motor is newly rotated and the internal logical volume newly designated to be mapped to the host logical volume designated in the region 7-23, the program deletes the present pointer 10-2 and newly sets pointers 10-3 and 10-4.

In this manner, the portion surrounded by the dotted lines is incorporated in the configuration holding the number of the ECC group having the HDD in which the spindle motor is rotating as exemplarily shown in FIG. 10 and the number of the internal logical volume provided by its ECC group so that thereafter it is regarded that the spindle motor of the HDD in the relevant ECC group is rotating.

Then, the next processing to be effected by the program is to bring the internal logical volume designated in the region 7-23 into the mapping relation to the host logical volume designated in the region 7-23 in the change-over portion 7-13 (7-28).

This is effected by updating configuration information to map the designated internal logical volumes to designated host logical volume newly or by updating the table for holding mapping of the number of the host logical volume and the number of the internal logical volume mapped to the host logical volume as exemplarily shown in FIG. 4 (8-8).

As disclosed in detail described above, the configuration of the host logical volume and the mapping of the internal logical volume are modified without varying the configuration of the host logical volume recognized by the host computer at all. This process makes it possible to access a plurality of (internal) logical volumes different in content from the side of the host computer through the host logical volume having the same identifier without any operation for again recognizing the host logical volume on the side of the host computer.

In the second method, instead of the application program 3-12 in the host computer 3-2, an operator of the host computer 3-2 directly operates the User Interface (UI) 3-29 of the control program 3-19 to change the mapping between the host logical volume and the internal logical volume.

The operator of the host computer 3-2 can designate the information which was given through the API 3-18 by the application program, that is, 1) the number of the host logical volume as an object to be changed, and 2) the number of the internal logical volume to be newly into mapped thereto.

Moreover, the operator of the host computer 3-2 can obtain, through the UI 3-29, the information which was obtained by the application program through the API 3-18, that is, 1) the configuration of the host logical volume, 2) the configuration of the internal logical volume, and 3) the mapping between the host logical volume and the internal logical volume.

In the second method, the operation for the control program 3-19 is only changed from the API 3-18 to the UI 3-29, but the interface between the control program 3-19 and the host logical volume (for control) 3-11 is exactly the same. Therefore, the same are the operation for obtaining the configuration information 3-17 in the storage control device 3-1 in the step 1 disclosed above, the operation of the program in the channel adapters in the storage control device 3-1 for changing the mapping between the host logical volume and the internal logical volume in step 2, and the operation of the program in the disk adapter.

The second embodiment will then be explained.

There are two different features from the embodiment already explained.

Figure 7:
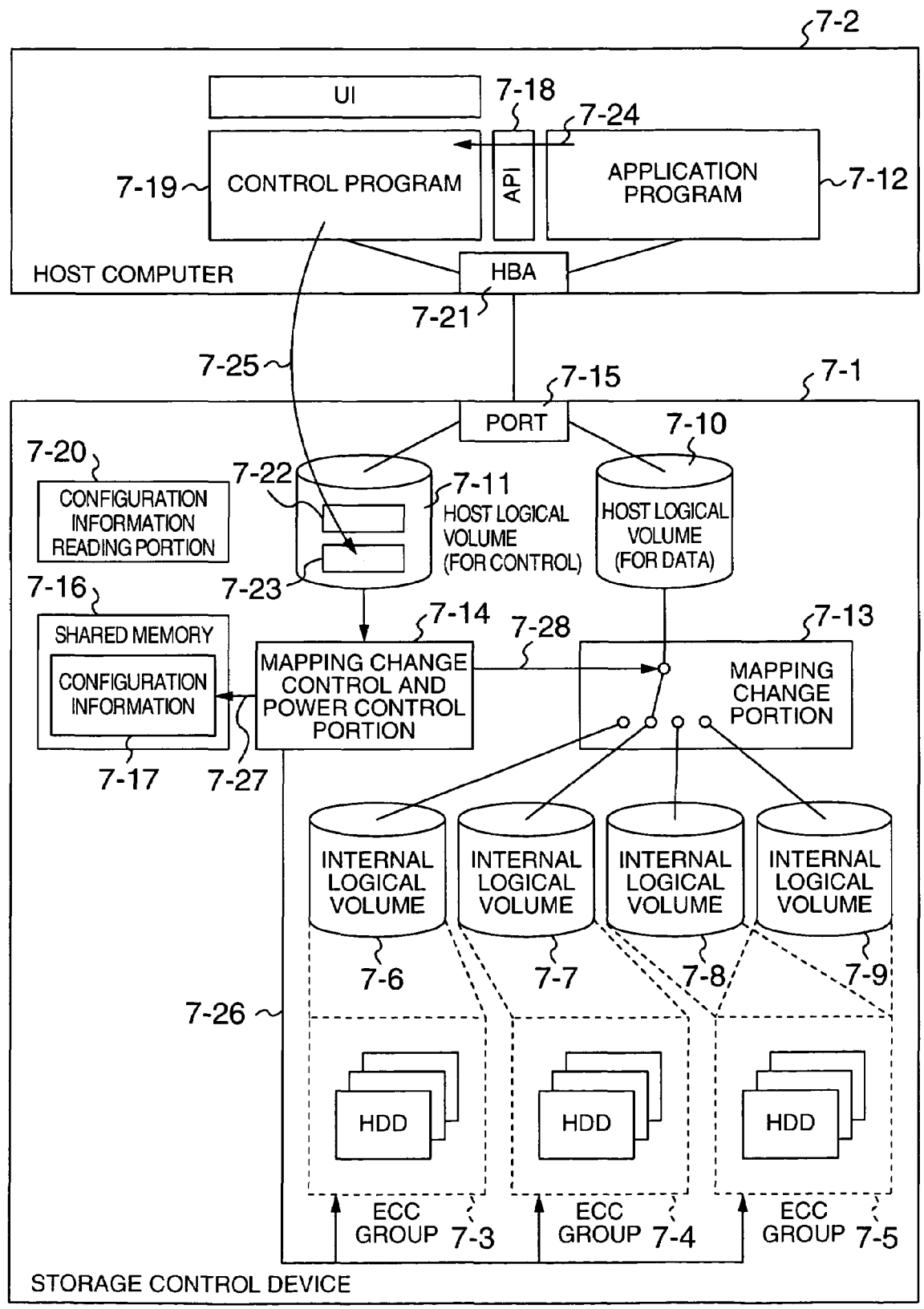
FIG. 7 is one example of the method for changing the correspondence between the host logical volume and the internal logical volume in the storage control device envisioned in the embodiment of the present invention.

The first different feature of the present embodiment is no use of the host logical volume (for control) 7-11 as in FIG. 7. Instead of the host logical volume (for control) 7-11, API for control 11-11 provided in the storage control device is used. The API for control 11-11 is provided by the program equipped in the storage control device 11-1. This program is operated in 1) the channel adapter equipped in the storage control device 11-1 or 2) service processor equipped in the storage control device 11-1.

The second difference of the present embodiment concerns with the transfer path of control information between the storage control device 11-1 and the host computer 11-2. In the embodiment already explained, the control program 7-19 carries out the reading the configuration information and writing the control information with respect to the host logical volume (for control) through the HBA 7-21 and the port 7-15. On the other hand, in the second embodiment, the control program 11-19 calls the control API 11-11 through the network interface card (NIC) 11-24 and the port 11-25 on the side of the storage control device 11-1 instead of the HBA 11-21 to carry out the reading of the configuration information and writing of the control information.

Although there are two differences described above, the basic processes of the reading out of the structural information 11-20 and the change mapping between the host logical volume and the internal logical volume are substantially similar to those in the embodiment already explained.

Next, the third embodiment will be disclosed.

In the embodiments already explained, a plurality of the HDD are divided into the ECC groups as shown at ECC group 2-12 in FIG. 2 and the memory regions made by the ECC groups are divided into one or plural regions to form the internal logical volumes, and the internal logical volumes are brought into mapping relation to the host logical volume. In the present embodiment, one HDD is used instead of the ECC groups without using the internal logical volumes provided by the ECC groups. The memory region made by the one HDD is divided into one or plural regions to form internal logical volumes which are then brought into the mapping relation to the host logical volume.

The third embodiment is substantially similar to the embodiments already explained with the exception that one HDD is used instead of the ECC groups.

In either case, the storage control device for storing data to be processed by the host computer is effective in utilizing the device for back-up and restoring of data or in utilizing as the archive.

Although the configuration of carrying out the present invention is explained using the HDD having the S-ATA as interconnection interface, it is to be understood that the invention is not limited to such a configuration and may be applicable to storage control devices utilizing other HDD's.

While the invention has been explained with reference to embodiments thereof which are intended to make the invention be easily understood and not to limit the invention. The invention can be modified and improved without departing from the spirit and scope of the invention and includes equivalents and the like in its scope.

What is claimed is:

1. A storage control device, comprising:
   a channel adapter operatively coupled to a computer, to provide upper logical volumes for the computer and to receive data sent from the computer to the upper logical volumes;
   a memory operatively coupled to the channel adapter to store the data sent from the computer and configuration information with respect to a configuration of the storage control device;
   a disk adapter operatively coupled to the channel adapter and the memory to control reading and writing of the data from/to the memory and to provide inner logical volumes at least one of which is mapped to one of the upper logical volumes, the inner logical volumes being used as storing regions for transmission and reception of the data between the channel adapter and the disk adapter;
   a plurality of disk drives operatively coupled to the disk adapter, in which the data sent from the computer are written by control of the disk adapter as a data group, wherein a first inner logical volume of the inner logical volumes is mapped to a first upper logical volume of the upper logical volumes and is mapped to a first set of disk drives in the plurality of disk drives, a first data group targeted to the first inner logical volume being written into the first set of disk drives;
   wherein a second upper logical volume of the upper logical volumes is operatively coupled to control the storage control device and is utilized when the configuration information in the memory is read by the computer;

wherein the channel adapter receives a command including a change-over instruction from the computer to be stored in the second upper logical volume, the change-over instruction including information identifying a second inner logical volume of the inner logical volumes to be mapped to the first upper logical volume;

wherein the channel adapter maps the second inner logical volume instead of the first inner logical volume to the first upper logical volume in response to the change-over instruction, stored in the second upper logical volume, and the channel adapter further operates to start a second set of disk drives from the plurality of disk drives that are mapped to the second inner logical volume;

wherein activation of the second set of disk drives that are mapped to the second inner logical volume starts in response to change-over from the first inner logical volume to the second inner logical volume;

wherein the channel adapter is configured to change over an inner logical volume mapped to the first upper logical volume from the first inner logical volume to the second inner logical volume in response to the change-over instruction which is different from a data reading or writing instruction from the computer coupled to the channel adapter; and wherein, with regard to the first set of disk drives mapping to the first inner logical volume, the channel adapter is configured to check whether an other upper logical volume is mapped to an error check and correction (ECC) group concerning the first set of disk drives in response to change-over from the first inner logical volume to the second inner logical volume, and if the other upper logical volume is not mapped to the ECC group then the activation of the first set of disk drives stops.

2. The storage control device as set forth in claim 1, wherein the channel adapter operates to stop driving the first set of disk drives in the plurality of disk drives mapped to the first inner logical volume in response to the change-over instruction.

3. The storage control device as set forth in claim 1, wherein the channel adapter judges whether spindle motors of the second set of disk drives mapped to the second inner logical volume are being operated or not, and if the spindle motors of the second set of disk drives are being operated, the channel adapter keeps an operation of the spindle motors of the second set of the disk drives to be continued, and if the spindle motors of the second set of the disk drives are not operated, the channel adapter operates to start the spindle motors of the second set of the disk drives.

4. The storage control device as set forth in claim 1, wherein if the first set of disk drives mapped to the first inner logical volume is also mapped to an another inner logical volume of the plurality of inner logical volumes, the channel adapter keeps operation of spindle motors of the first set of disk drives continuing even if the first inner logical volume is unmapped from the first upper logical volume in response to the change-over instruction.

5. The storage control device as set forth in clam 1, wherein if the first set of disk drives mapped to the first inner logical volume is not mapped to another inner logical volume of the plurality of inner logical volumes, the channel adapter operates to stop spindle motors of the first set of disk drives if the first inner logical volume is unmapped from the first upper logical volume in response to the change-over instruction.

6. The storage control device as set forth in claim 1, wherein a second command sent from the computer to the second upper logical volume is a write command, the channel adapter judges that a content of the write command includes the change-over instruction.

7. The storage control device as set forth in claim 1, wherein a second command sent from the computer to the second upper logical volume is a read command, the channel adapter judges that an object of the read command is the configuration information, reads the configuration information from the memory, and sends the configuration information to the computer.

8. The storage control device as set forth in claim 1, further comprising:
a power control device, wherein in response to an indication from the channel adapter, the power control device stops supplying power to spindle motors of the first set of disk drives, and the power control device operates to supply power to spindle motors of the second set of disk drives.

9. The storage control device as set forth in claim 1, wherein a second command sent from the computer is addressed to the first upper logical volume, the channel adapter judges that the second command sent from the computer is a command concerning writing or reading of the data, and if the second command sent from the computer is addressed to the second upper logical volume, the channel adapter judges that the second command sent from the computer is a command concerning the control information.

10. The storage control device as set forth in claim 1, wherein a first content of the first data group stored in the first inner logical volume is different from a second content of a second data group stored in the second inner logical volume.

11. A storage system coupled to a computer, comprising:
an interface coupled to the computer;
a plurality of disk drives;
a plurality of upper volumes for the computer;
a plurality of inner volumes which are mapped to the plurality of disk drives, wherein a first upper volume of the plurality of upper volume is mapped to a first inner volume of the plurality of inner volumes so as to access the first inner volume by the computer;
wherein, in response to receiving an access command at the interface from the computer for accessing the first upper volume of the plurality of upper volumes, the first inner volume mapped to the first upper volume is accessed by the computer via the first upper volume;
wherein the first upper volume is mapped to a second inner volume of the plurality of inner volumes instead of the first inner volume in response to receiving an instruction from the computer to assign the second inner volume to the first upper volume such that the second inner volume is accessed by the computer via the first upper volume in response to receiving the access command at the interface for accessing the first upper volume;
wherein activation of disk that are mapped to the second inner logical volume starts in response to change-over from the first inner logical volume to the second inner logical volume;
wherein a storage control device is configured to change over an inner logical volume mapped to the first upper logical volume from the first inner logical volume to the second inner logical volume in response to the instruction which is different from a data reading or writing instruction from the computer coupled to the storage control device; and wherein, with regard to the plurality of disk drives mapping to the first inner logical volume, the storage control device is configured to check whether an other upper logical volume is mapped to an error check and correction (ECC) group concerning the plurality of disk drives in response to change-over from the first inner logical volume to the second inner logical volume, and if the other upper logical volume is not mapped to the ECC group then the activation of the plurality of disk drives stops.

12. A storage system according to claim 11, wherein a first group of disk drives of the plurality of disk drives mapped to the first inner volume is stopped in response to receiving the instruction from the computer to assign the second inner volume to the first upper volume instead of the first inner volume.

13. A storage system according to claim 12, wherein a second group of disk drives of the plurality of disk drives mapped to the second inner volume is started in response to receiving the instruction from the computer to assign the second inner volume to the first upper volume if the second group of disk drives is not operated.

14. A storage system according to claim 13, wherein the first group of disk group is kept operating even if the first inner volume is unmapped from the first upper volume in response to the instruction from the computer if the first group of disk group is mapped to an another inner volume of the plurality of inner volumes.

15. A storage system according to claim 11, wherein the second upper volume receives the instruction as a write command.

16. A storage system according to claim 15, wherein the first inner volume stores a first content which is sent by the computer during a first period before receiving the instruction, and wherein the second inner volume stores a second content which is sent by the computer during a second period after receiving the instruction.

17. A storage control system operatively coupled to an external device, comprising:
a channel adapter operatively coupled to the external device and configured to provide access to and from a plurality of upper logical volumes;
a memory operatively coupled to the channel adapter to store at least configuration information for configuration of the storage control system;
a disk adapter operatively coupled to the channel adapter and the memory to control reading and writing of the data from/to the memory and to provide a plurality of inner logical volumes being used to store data for transmission and reception between the channel adapter and the disk adapter;
a plurality of disk drives operatively coupled to the disk adapter;
wherein a first inner logical volume of the inner logical volumes is mapped to a first upper logical volume of the upper logical volumes and is mapped to a first set of disk drives of the plurality of disk drives;
wherein a second upper logical volume of the upper logical volumes is configured to receive a change-over instruction from the external device, the channel adapter is configured to receive the change-over instruction by using the second upper logical volume, the change-over instruction including information identifying a second inner logical volume of the plurality of inner logical volumes to be mapped to the first upper logical volume;
the channel adapter is configured to map the second inner volume instead of the first inner logical volume to the first upper logical volume in response to the change-over instruction received at the second upper logical volume;
the disk adapter is further configured to operate a second set of disk drives of the plurality of disk drives that are mapped to the second inner logical volume after that the first upper logical volume is mapped to the second inner logical volume instead of the first inner logical volume;
wherein activation of the second set of disk drives that are mapped to the second inner logical volume starts in response to change-over from the first inner logical volume to the second inner logical volume;
wherein the channel adapter is configured to change over an inner logical volume mapped to the first upper logical volume from the first inner logical volume to the second inner logical volume in response to the change-over instruction which is different from a data reading or writing instruction from the computer coupled to the channel adapter; and
wherein, with regard to the first set of disk drives mapping to the first inner logical volume, the channel adapter is configured to check whether an other upper logical volume is mapped to an error check and correction (ECC) group concerning the first set of disk drives in response to change-over from the first inner logical volume to the second inner logical volume, and if the other upper logical volume is not mapped to the ECC group then the activation of the first set of disk drives stops.

18. A storage control system according to claim 17, wherein the channel adapter operates to stop driving the first set of disk drives in the plurality of disk drives mapped to the first inner logical volume in response to the change-over instruction.

19. A storage control system according to claim 17, wherein the channel adapter judges whether spindle motors of the second set of disk drives mapped to the second inner logical volume are being operated or not, and if the spindle motors of the second set of disk drives are being operated, the channel adapter keeps an operation of the spindle motors of the second set of the disk drives to be continued, and if the spindle motors of the second set of the disk drives are not operated, the channel adapter operates to start the spindle motors of the second set of the disk drives.

20. A storage control system according to claim 17, wherein if the first set of disk drives mapped to the first inner logical volume is also mapped to an another inner logical volume of the plurality of inner logical volumes, the channel adapter keeps operation of spindle motors of the first set of disk drives continuing even if the first inner logical volume is unmapped from the first upper logical volume in response to the change-over instruction.

21. A storage control system according to claim 17, wherein if the first set of disk drives mapped to the first inner logical volume is not mapped to another inner logical volume of the plurality of inner logical volumes, the channel adapter operates to stop spindle motors of the first set of disk drives if the first inner logical volume is unmapped from the first upper logical volume in response to the change-over instruction.

22. A storage control system according to claim 17, wherein a second command sent from the computer to the second upper logical volume is a write command, the channel adapter judges that a content of the write command includes the change-over instruction.

23. A storage control system according to claim 17, wherein a second command sent from the computer to the second upper logical volume is a read command, the channel adapter judges that an object of the read command is the configuration information, reads the configuration information from the memory, and sends the configuration information to the computer.

24. A storage control system according to claim 17, further comprising:
a power control device, wherein in response to an indication from the channel adapter, the power control device stops supplying power to spindle motors of the first set of disk drives, and the power control device operates to supply power to spindle motors of the second set of disk drives.

25. A storage control system according to claim 17, wherein a second command sent from the computer is addressed to the first upper logical volume, the channel adapter judges that the second command sent from the computer is a command concerning writing or reading of the data, and if the second command sent from the computer is addressed to the second upper logical volume, the channel adapter judges that the second command sent from the computer is a command concerning the control information.

26. A storage control system according to claim 17, wherein a first content of the first data group stored in the first inner logical volume is different from a second content of a second data group stored in the second inner logical volume.

27. A storage control system according to claim 17, wherein a first group of disk drives of the plurality of disk mapped to the first inner volume is stopped in response to receiving the instruction from the computer to assign the second inner volume to the first upper volume instead of the first inner volume.

28. A storage control system according to claim 27, wherein a second group of disk drives of the plurality of disk drives mapped to the second inner volume is started in response to receiving the instruction from the computer to assign the second inner volume to the first upper volume if the second group of disk drives is not operated.

29. A storage control system according to claim 28, wherein the first group of disk group is kept operating even if the first inner volume is unmapped from the first upper volume in response to the instruction from the computer if the first group of disk group is mapped to an another inner volume of the plurality of inner volumes.

30. A storage control system according to claim 17, wherein the second upper volume receives the instruction as a write command.

31. A storage control system according to claim 30, wherein the first inner volume stores a first content which is sent by the computer during a first period before receiving the instruction, and
wherein the second inner volume stores a second content which is sent by the computer during a second period after receiving the instruction.

* * * * *